United States Patent [19]

Garnham

[11] 4,362,332
[45] Dec. 7, 1982

[54] SUNROOF AIR DEFLECTOR

[75] Inventor: Edward E. Garnham, Birmingham, Mich.

[73] Assignee: General Motors Corporation, Detroit, Mich.

[21] Appl. No.: 247,726

[22] Filed: Mar. 26, 1981

[51] Int. Cl.³ ............................................. B60J 7/04
[52] U.S. Cl. ................................................. 296/217
[58] Field of Search ........................................ 296/217

[56] References Cited

U.S. PATENT DOCUMENTS

| | | | |
|---|---|---|---|
| 3,874,723 | 4/1975 | Coenen | 296/217 |
| 3,981,531 | 9/1976 | Koral | 296/217 |
| 4,081,194 | 3/1978 | Jardin | 296/217 |
| 4,142,759 | 3/1979 | Bienert | 296/217 |
| 4,175,785 | 11/1979 | Leiter | 296/217 |

Primary Examiner—Robert R. Song
Attorney, Agent, or Firm—Charles E. Leahy

[57] ABSTRACT

An air deflector for deflecting oncoming airflow above a vehicle body sunroof opening includes a deflector panel pivotally mounted on a carriage for movement between an angularly raised air deflecting position above the roof panel and downwardly pivoted position below the contour of the roof panel. The carriage is mounted on a track for longitudinal movement of the carriage and deflector panel between a rearward position registering with the roof opening and a stored position forward of the roof opening and beneath the roof panel. An overcenter spring holds the deflector panel in either the raised air deflecting position or the downwardly pivoted position. A control rod pivoted to the deflector panel is depressed by closing movement of the closure panel to pivot the deflector panel downwardly and is then pushed forwardly by the closure panel to push the deflector panel and carriage forward along the track to the stored position. A control link couples with the closure panel during opening movement to tow the deflector panel and carriage rearwardly. A control cam raises the control link and the actuator rod to uncouple the control link from the closure panel and pivot the deflector panel upwardly to the angularly raised air deflecting position.

3 Claims, 7 Drawing Figures

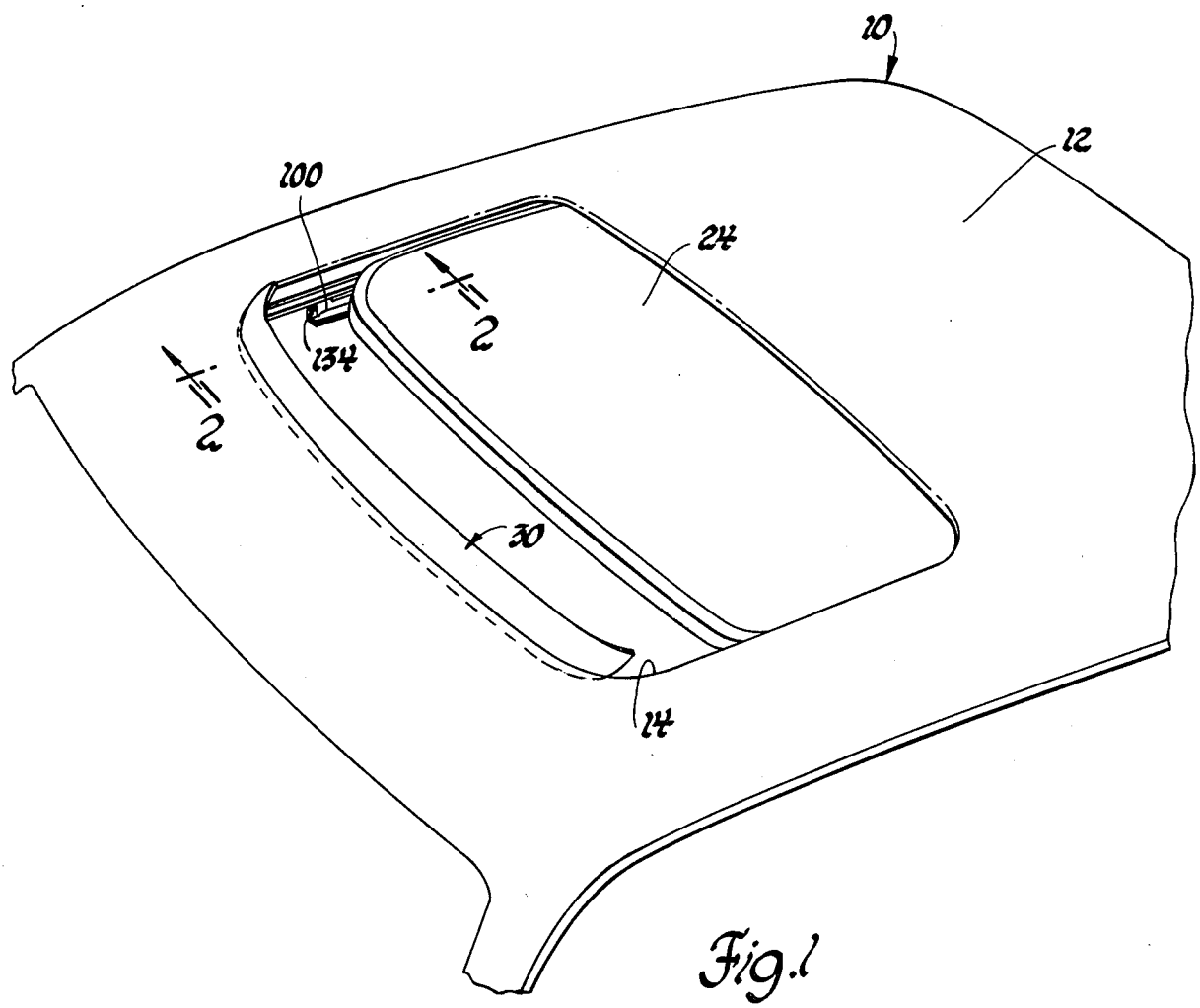
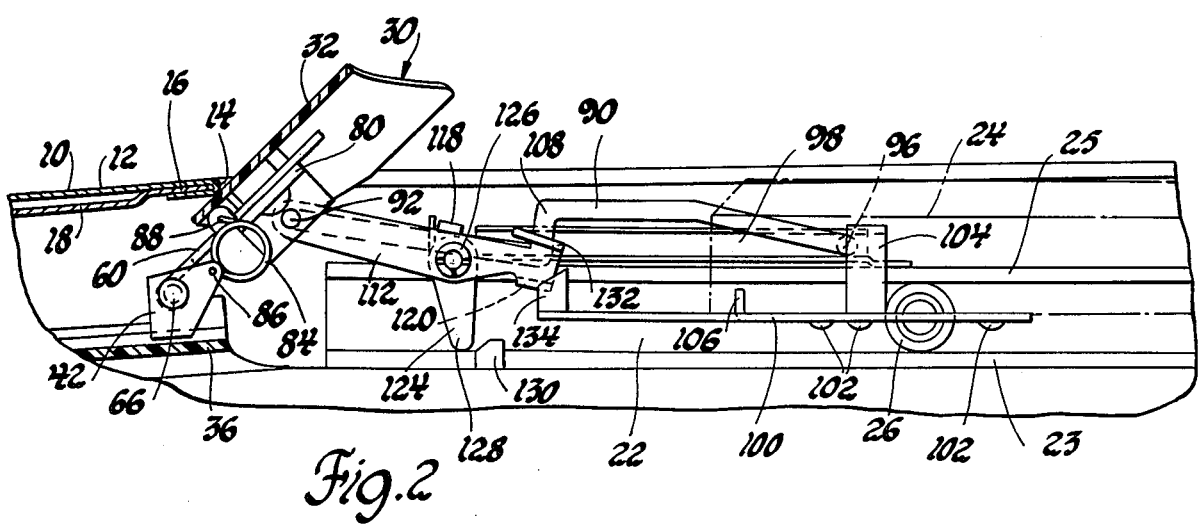

SUNROOF AIR DEFLECTOR

The invention relates to a vehicle body sunroof and more particularly provides an air deflector which is movable between an angularly raised deflecting position and a stowed position in which the deflector is pivoted downwardly below the roof panel and moved longitudinally forward of the sunroof opening.

It is well known to provide an air deflector panel at the leading edge of the vehicle body sunroof opening. Such deflector panels are disposed in an angularly raised position so as to deflect the oncoming air stream above the roof opening. It is also well known to mount the air deflector on a pivoted linkage which automatically lowers the wind deflector from the angularly raised deflecting position to a downwardly pivoted stored position upon forward sliding movement of the sunroof closure panel to the closed position.

The present invention provides a new and improved mounting arrangement for a sunroof air deflector and more particularly provides a track by which the deflector panel and the pivoting mechanism thereof are translated bodily forward to a stored position beneath the roof panel and substantially forward of the sunroof opening.

According to the invention, an air deflector for deflecting oncoming airflow above a vehicle body sunroof opening includes a deflector panel pivotally mounted on a carriage for movement between an angularly raised air deflecting position above the roof panel and a downwardly pivoted position below the contour of the roof panel. The carriage is mounted on a track for longitudinal movement of the carriage and deflector panel between a rearward position registering with the roof opening and a stored position forward of the roof opening and beneath the roof panel. An overcenter spring holds the deflector panel in either the raised air deflecting position or the downwardly pivoted position. A control rod pivoted to the deflector panel is depressed by closing movement of the closure panel to pivot the deflector panel downwardly and is then pushed forwardly by the closure panel to push the deflector panel and carriage forward along the track to the stored position. A control link carried by the actuator rod couples with the closure panel during opening movement to tow the deflector panel and carriage rearwardly. A control cam raises the control link and the actuator rod to uncouple the control link from the closure panel and pivot the deflector panel upwardly to the angularly raised air deflecting position.

These and other objects, features, and advantages of the invention become apparent upon consideration of the specification and the appended drawings in which:

FIG. 1 is a perspective view of a vehicle body roof structure having a sunroof air deflector according to the invention;

FIG. 2 is a side elevation view of the vehicle body and air deflector taken in the direction of arrows 2—2 of FIG. 1 and showing the air deflector in the angularly raised air deflecting position;

Figure 3:
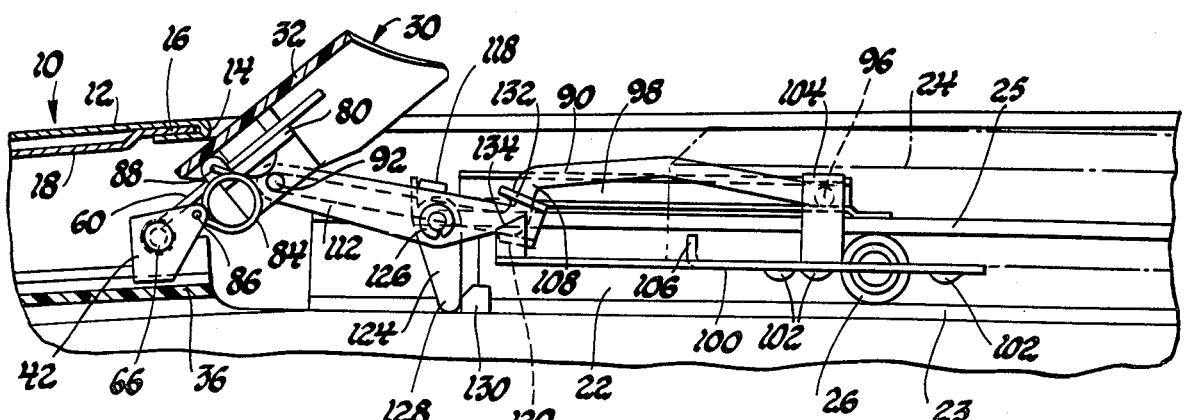
FIG. 3 is a view similar to FIG. 2 but showing an initial stage of movement of the closure panel in the closing direction to initiate downward pivotal movement of the wind deflector.

Referring to FIGS. 1 and 2, a vehicle body roof structure 10 includes an outer roof panel 12 having an opening 14 in the forward portion thereof which generally overlies the front seat of the motor vehicle. As best seen in FIG. 2, the opening 14 is provided by hem flanging the outer roof panel 12 over the edge 16 of an inner roof panel 18. A sunroof module mounted on the vehicle body roof structure 10 beneath the outer roof panel 12 includes a pair of laterally spaced tracks, one of which is designated 22. The track 22 is of C-shaped cross section and includes a lower rail 23 and an upper rail 25. Sunroof closure panel 24 is mounted for movement between a forward closed position and a rearward open position by rollers, one of which is designated 26, which roll within the laterally spaced tracks. Reference may be had to Koral et al. U.S. Pat. No. 3,981,531, issued Sept. 21, 1976, for a further description of a suitable and preferred mechanism for moving the closure panel 24 between the open and closed positions.

An air deflector, generally indicated at 30, is provided for deflecting the oncoming airflow above the roof opening 14. The air deflector 30 includes a molded plastic deflector panel 32 mounted on the vehicle body by a mechanism which functions to pivot the deflector panel 32 between the angularly raised rearward position of FIG. 2 and the downwardly pivoted forward stowage position of FIG. 5.

Figure 6:
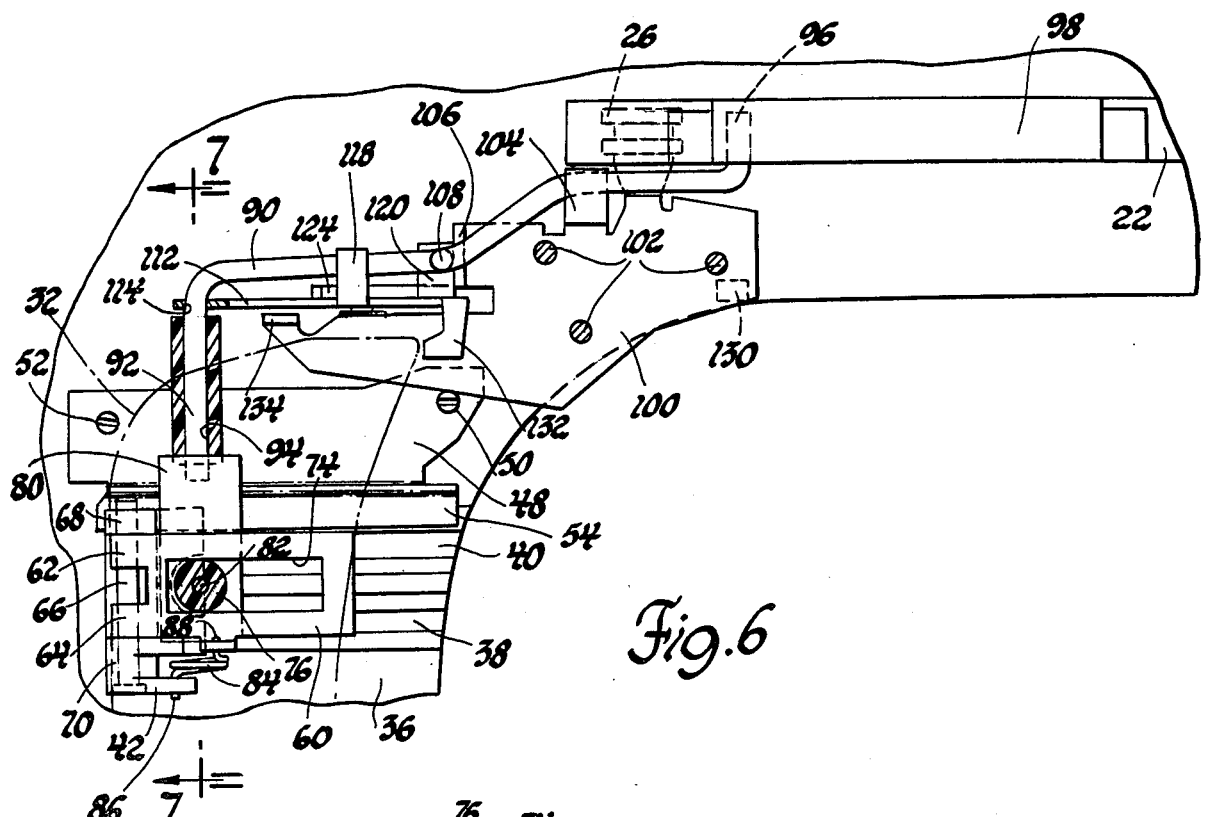
FIG. 6 is a plan view corresponding to FIG. 5.
Figure 7:
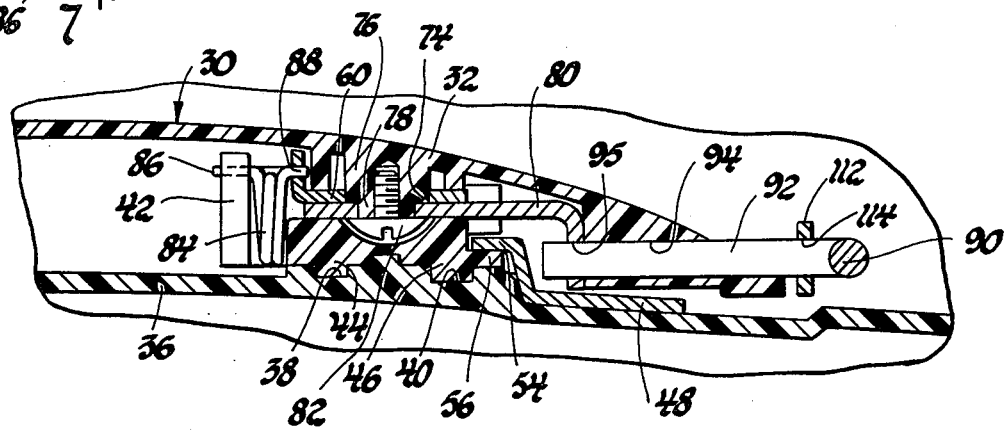
FIG. 7 is a sectional view taken in the direction of arrows 7—7 of FIG. 6.

As best seen in FIGS. 2, 6, and 7, a molded plastic frame panel 36 is suitably attached to the vehicle roof structure 10 and has an integrally molded pair of track grooves 38 and 40. A molded plastic carriage block 42 has laterally spaced slide abutments 44 and 46 which seat within the track grooves 38 and 40 for longitudinal movement therealong. A retaining plate 48 is attached to the frame panel 36 by screws 50 and 52 and has a flange 54 which overlies a ridge 56 of the carriage 42 to retain the carriage 42 in sliding engagement with the track grooves 38 and 40.

The deflector panel 32 is connected to the carriage block 42 by a mounting plate 60. As best seen in FIGS. 2 and 6, the mounting plate 60 has legs 62 and 64 which are bent to encircle a pivot shaft 66 extending between spaced apart legs 68 and 70 of the carriage block 42. The mounting plate 60 also has a longitudinally extending slot 74 which slidably receives a cylindrical projection 76 of the deflector panel 32. An operating bracket 80 underlies the deflector panel 32 and the mounting plate 60 and has an aperture which receives a necked down shoulder portion 78 of the cylindrical projection 76 and screw 82 to slidably capture the mounting plate 60 in a manner which permits relative longitudinal motion of the cylindrical projection 76 along the slot 74 so that the deflector panel 32 is permitted a range of longitudinal movement relative the carriage block 42.

Referring to FIGS. 2, 6, and 7, a torsion spring 84 has one leg 86 anchored in an aperture of the carriage block 42 and the other leg 88 anchored in a mounting aperture of the mounting plate 60. In comparing the FIG. 2 raised position of the deflector panel 32 with the FIG. 5 stored position, it is seen that the leg 88 of torsion spring 84 goes overcenter with respect to the leg 86 and the axis of the pivot shaft 66 so that the deflector panel 32 will be spring biased to either the raised position or the lowered position.

An operating mechanism is also provided to couple the sunroof with the air deflector to automatically move the air deflector between the air deflecting and stored positions. The operating mechanism includes an actuator rod 90 having a laterally offset front arm 92 extending into aligned bores 94 of the deflector panel 32 and 95 of the operating bracket 80 and a laterally offset rear arm 96 which is slidably captured within a guide track 98 which is welded to the upper rail 25 of the track 22. As best seen in FIGS. 2 and 6, the closure panel 24 has a bracket 100 attached to the underside thereof by a plurality of screws 102. The bracket 100 includes an outwardly offset pull-down tab 104 which overlies the actuator rod 90 and an upwardly bent pusher tab 106 which faces toward a vertically disposed drive portion 108 of the actuator rod 90. Progressive forward closing movement of the sunroof panel 24 as shown in FIGS. 1, 2, 3, and 4 carries the pull-down tab 104 into engagement with the actuating rod 90 to progressively pivot the actuating rod 90 downwardly as seen during movement from positions of FIGS. 2, 3, and 4. Further forward closing movement carries the pusher tab 106 into engagement with the drive portion 108 of the actuator rod 90 to push the rod 90 and the deflector panel 32 forwardly to the stored position of FIG. 5 as will be more fully disclosed hereinafter.

A control link 112 includes a forward end having an aperture 114 which receives the front arm 92 of the actuator rod 90 to mount the control link 112 for pivotal movement about the front arm 92. As best seen in FIGS. 3 and 6, the control link 112 has an offset control tab 118 which overlies the actuator rod 90 and a control tab 120 which underlies the actuator rod 90 to limit the range of pivotal movement of the control link 112 relative the actuator rod 90. A control cam 124 is pivotally mounted on the control link 112 by a pivot 126 and has a leg 128 which depends downwardly into engagement with the plastic frame panel 36 and a cam abutment 130 provided on the plastic frame 36. The control link 112 also has a lateral hook 132 which is engageable by an upstanding puller tab 134 of the bracket 100 to tow the air deflector rearwardly from the position of FIGS. 5 and 6 to the position of FIG. 3 as will be discussed more fully hereinafter.

OPERATION

Referring to FIG. 2, the deflector panel 32 is shown in the angularly raised position for deflecting the oncoming airflow above the roof opening 14. The deflector panel 32 is held in the angularly raised position by the action of torsion spring 84 acting between the carriage block 42 and the mounting plate 60 attached to the deflector panel 32. FIG. 2 shows the closure panel 24 in a partially open or closed position without any interaction between the closure panel 24 and the air deflector.

FIG. 3 shows the closure panel 24 moved further forward from the FIG. 2 position so that the pull-down tab 104 of the closure panel bracket 100 has moved forwardly into overlying engagement with the rearmost segment of the actuator rod 90 and has initiated downward pivoting movement of the actuator rod 90 about its rear arm 96 which is captured within the track 98. The front arm portion 92 of the actuator rod 90 is pivotally received within a bore 94 of the deflector panel 32 and accordingly initiates a downward pivoting motion of the air deflector 32 about the pivot shaft 66. The control tab 120 of the control link 112 is also urged downwardly by the actuator rod 90 so that the leg 128 of the control cam 124 interacts with the cam abutment 130 and the surface of the plastic frame panel 36 in a manner to impart a limited forward motion to the actuator rod 90 and the deflector panel 32. This forward motion is accommodated by lost motion of the deflector panel cylindrical projection 76 within a slot 74 of mounting plate 60 and/or by forward sliding movement of the carriage block 42 along the track grooves 38 and 40 of the plastic frame panel 36.

Figure 4:
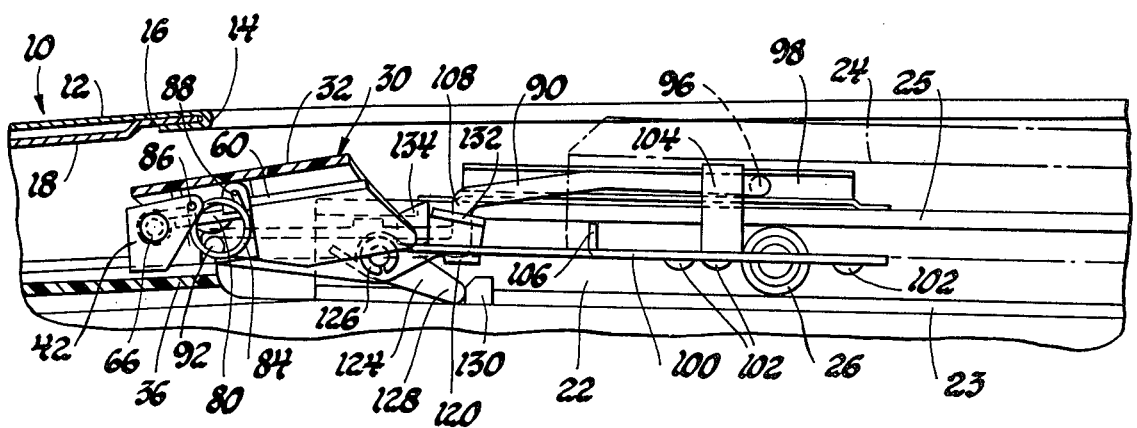
FIG. 4 is a view similar to FIG. 3 but showing a further movement of the closure panel in the closing direction in which the air deflector panel is nearly completely pivoted to the downward position.
Figure 5:
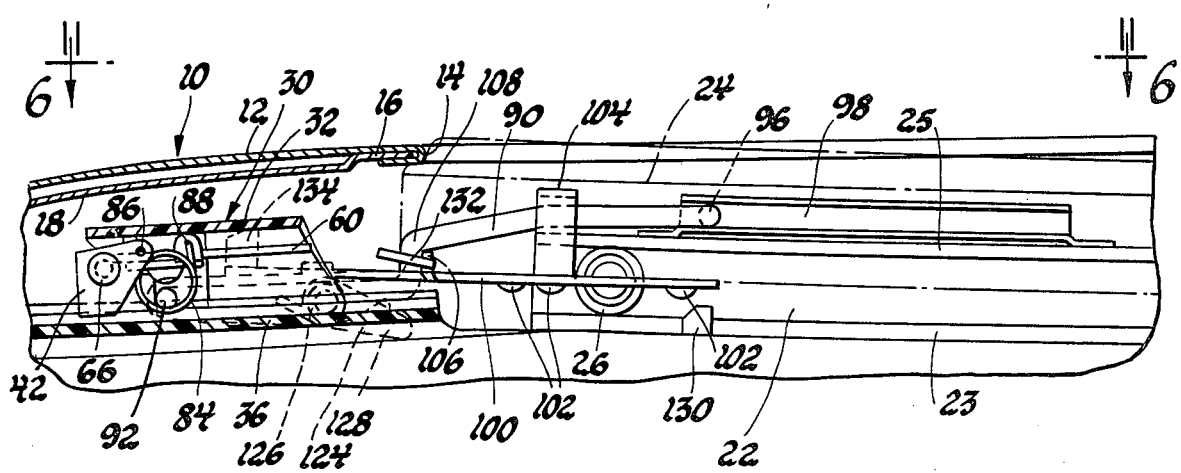
FIG. 5 is a view similar to FIG. 4 but showing the closure panel fully closed and the air deflector panel translated fully forward to the stored position beneath the roof panel.

Referring to FIG. 4 it is seen that a still further forward movement of the closure panel 24 and the pull-down tab 104 thereof completes the downward pivotal movement of the actuator rod 90 and the control link 112 so that the control cam 124 moves the actuator rod 90 and deflector panel 72 substantially further forward and pivots the deflector panel 32 further downwardly about pivot shaft 66 to the position of FIG. 4 in which the one leg 86 of the torsion spring 84 anchored on the carriage 42 goes overcenter with respect to the other leg 88 anchored in the deflector panel mounting plate 60 and the axis of the pivot shift 66 so that the deflector panel 32 is spring-biased to the full lowered position of FIG. 5.

Referring to FIG. 5, it is seen that further forward movement of the closure panel 24 causes pusher tab 106 of the bracket 100 to engage a vertically disposed drive portion 108 of the actuator rod 90 so that the closure panel 24 pushes the actuator rod 90 and the deflector panel 32 substantially forward to the stored position as permitted by sliding movement of the carriage block 42 along the track grooves 38 and 40 of the plastic frame panel 36.

Referring again to FIG. 5, it is seen that the downwardly pivoted position of the actuator rod 90 and the control link 112 causes the hook 132 of the control link to be disposed rearwardly of the puller tab 134 of bracket 100. Accordingly, rearward opening movement of the closure panel 24 causes the puller tab 134 to couple with the hook 132 of the control link 112 to tow the deflector panel 32 rearwardly as permitted by sliding movement of the carriage block 42 along the track grooves 38 and 40.

When the air deflector reaches the position corresponding to FIG. 4, the leg 128 of the control cam 124 engages the cam abutment 130 and initiates upward pivoting movement of the control link 112 to lift the hook 132 out of coupling engagement with the puller tab 134. The upward movement of the control link 112 by the control cam 124 also engages the control tab 120 with the actuator rod 90 so that the actuator rod 90 pivots about its rear arm 96 and pivots the deflector panel 32 and mounting plate 60 upwardly to move the torsion spring 84 overcenter whereby the air deflector is spring biased to the upwardly raised position with a snap action during which the relative longitudinal motion is accommodated by the movement of the air deflector cylindrical projection 76 within the slot 74 of the mounting plate 60 as well as longitudinal movement of the carriage block 42 along the track grooves 38 and 40.

Thus it is seen that the invention provides a new and improved mounting arrangement for a sunroof air deflector and more particularly provides a track by which the deflector panel is translated bodily forward to a stored position beneath the roof panel and substantially forward of the sunroof. Furthermore, it is seen that the invention provides a control and coupling arrangement which interacts between the closure panel and a movable air deflector to effect downward pivoting and bodily forward movement of the closure panel during closing movement of the closure panel and to effect rearward bodily movement of the air deflector and upward pivoting movement thereof upon opening movement of the closure panel.

The embodiments of the invention in which an exclusive property or privilege is claimed are defined as follows:

1. In combination with a vehicle body roof panel having a roof opening, and a sunroof closure panel adapted for movement between a forward closed position and a rearward open position, an air deflector device comprising:
   a deflector panel adapted for mounting within the roof opening at an angularly raised position projecting above the roof panel to deflect oncoming airflow above the roof opening;
   mounting means mounting the deflector panel for pivotal movement between the angularly raised air deflecting position and a downwardly pivoted position below the roof panel;
   track means acting between the vehicle body and the mounting means and adapted to permit longitudinal translation of the deflector panel between a rearward position registering with the roof opening and a stored position beneath the roof panel substantially forward of the roof opening;
   and operating means operatively associated with the mounting means selectively coupled with the closure panel during forward movement of the closure panel to effect downward pivotal movement of the deflector panel from the angularly raised position and bodily forward movement of the deflector panel to the stored position substantially forward of the sunroof opening.

2. In combination with a vehicle body roof panel having a roof opening, and a sunroof closure panel adapted for movement between a forward closed position and a rearward open position, an air deflector device comprising:
   a deflector panel adapted to deflect oncoming airflow above the roof opening;
   a carriage means having the deflector panel pivotally mounted thereon for movement between an angularly raised air deflecting position above the roof panel and a downwardly pivoted position below the roof panel;
   track means on the vehicle body mounting the carriage means for longitudinal movement to carry the deflector panel between a rearward position registering with the roof opening and a stored position substantially forward of the roof opening and beneath the roof panel;
   spring means acting between the deflector panel and the carriage means and adapted to alternately bias the deflector panel to either the angularly raised air deflecting position or the downwardly pivoted position;
   and operating means operatively associated with the deflector panel and selectively coupled with the closure panel during closing of the closure panel to effect downward pivotal movement of the deflector panel from the angularly raised position and move the carriage means and deflector panel forward to the stored position substantially forward of the sunroof opening.

3. In combination with a vehicle body roof panel having a roof opening, and a sunroof closure panel adapted for fore and aft movement between a forward closed position and a rearward open position, an air deflector device comprising:
   a deflector panel adapted to deflect oncoming airflow above the roof opening;
   a carriage means having the deflector panel mounted thereon for pivotal movement between an angularly raised air deflecting position above the roof panel and a downwardly pivoted position below the roof panel;
   track means on the vehicle body mounting the carriage means for longitudinal movement of the deflector panel between a rearward position registering with the roof opening and a stored position substantially forward of the roof opening and beneath the roof panel;
   spring means acting between the deflector panel and the carriage means and adapted to alternately bias the deflector panel to either the angularly raised air deflecting position or the downwardly pivoted position;
   actuator means pivotally associated with the deflector panel and extending into the path of closing movement of the closure panel so that closing movement of the closure panel acts upon the actuator means to effect downward pivotal movement of the deflector panel from the angularly raised position to the downwardly pivoted position and pushes the carriage means and deflector panel bodily forward to the stored position substantially forward of the sunroof opening;
   control means associated with the deflector panel and extending into the path of opening movement of the closure panel for selective coupling therewith so that opening movement of the closure panel tows the carriage means and deflector panel bodily rearward to register with the roof opening;
   and cam means effective to pivot the deflector panel upwardly to the angularly raised position and uncouple the control means from the closure panel whereby the closure panel is permitted to move to the full open position.

* * * * *